June 20, 1967  J. E. HELD  3,326,208
ENDOSCOPE INSTRUMENT AND OBTURATOR THEREFOR
Filed July 22, 1964
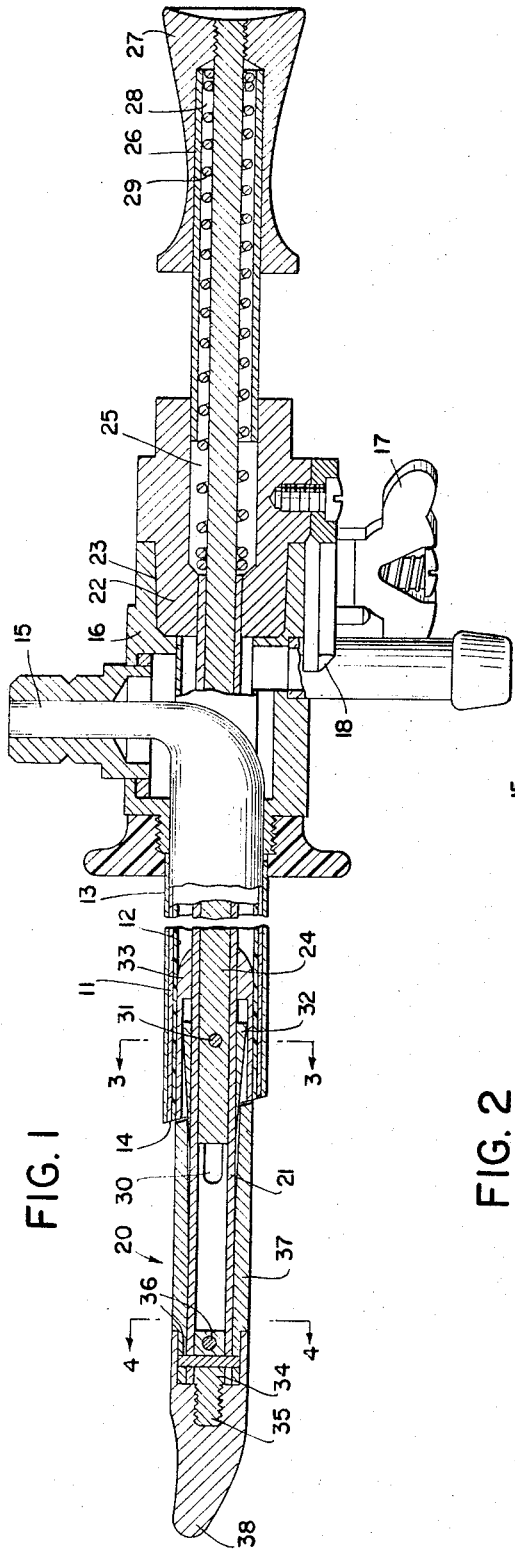
FIG. 1
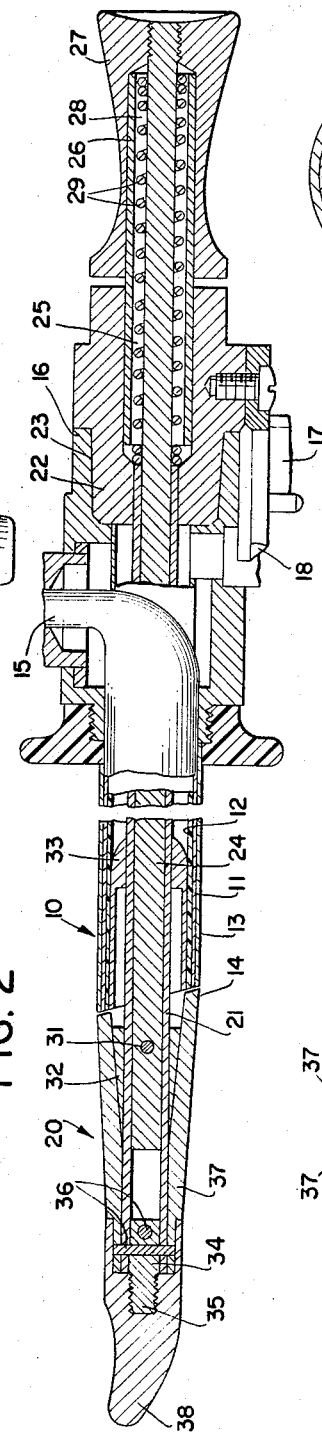
FIG. 2
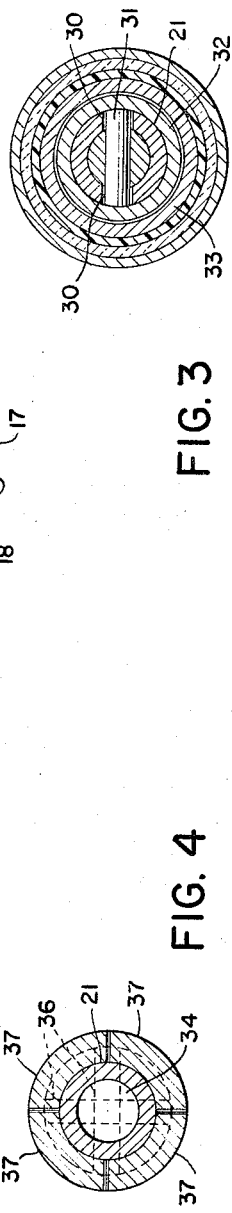
FIG. 3
FIG. 4

United States Patent Office 3,326,208
Patented June 20, 1967

3,326,208
ENDOSCOPE INSTRUMENT AND OBTURATOR THEREFOR
Joseph E. Held, New Rochelle, N.Y., assignor to American Cystoscope Makers, Inc., a corporation of New York
Filed July 22, 1964, Ser. No. 384,436
1 Claim. (Cl. 128—7)

ABSTRACT OF THE DISCLOSURE

An endoscopic instrument having a tubular sheath with a substantially planar end wall and an obturator extending in the sheath with its distal end projecting therebeyond. Wing members on the exposed distal end portion of the obturator are adjustable from the proximal end of the instrument between one position in which the distal end portion of the obturator, together with the wing members, has an outer diameter less than the inner diameter of the sheath and a second position in which the outer diameter of the distal end portion of the obturator equals the outer diameter of the sheath end wall.

The present invention relates to endoscopic instruments and more particularly to such medical instruments which are introduced into internal ducts and cavities in the body of a patient to carry out diagnostic and surgical procedures.

In the copending application of Frederick J. Wallace filed Sept. 27, 1963, Ser. No. 312,167, now Patent No. 3,294,085 dated Dec. 27, 1966 and assigned to the assignee of the present application, there is set forth an improved endoscope in the form of a resectoscope which has proven highly successful in carrying out prostatic resection as well as other surgical procedures. An important advantage of that instrument resides in the improved illumination that makes possible more perfect visualization of the area under view. For example, abnormalities of the urethra, prostrate and bladder may be more accurately diagnosed and treated as a result of the improved illumination of such instruments. The improved illumination as well as a highly efficient and safer arrangement is achieved by forming the sheath of the instrument with fiber optics embedded therein and extending from its distal end to adjacent its proximal end. Upon illumination of the proximal ends of the fiber optics, which may be in the form of a rod-shaped array, the light is conducted along the fiber optics to their distal ends to form an annular source of light for illuminating the field of view of the telescope or other viewing device used with the instrument.

Thus, the generally annular distal end wall of the instrument in which the distal ends of the fiber optics terminate forms a highly advantageous source of illumination. Because of the refraction of light which occurs as the light rays pass from the medium of the glass fiber optics, of one of index refraction, to the air or liquid environment of the area under view, of a different index of refraction, considerable care must be exercised in shaping and polishing the exit ends of the fiber optics to avoid undesired refraction of the light with a consequent light loss or objectionably uneven light distribution in the field. In practice, it is desirable to terminate the distal end wall of the sheath as a substantially planar surface to avoid undesired effects of refraction and to facilitate attainment of the desired uniform distribution of light over the field of view.

Though the wall thickness of such an endoscope sheath may be relatively thin, about .030 inch or less, its essentially planar, untapered distal end wall projects to that extent beyond conventional obturators used to facilitate introduction of the instrument, as for example, into the urethra of a patient. Because the urethra has an extremely thin, fragile wall membrane, extreme care must be exercised in introducing and manipulating an instrument in the urethra. While the distal end wall of the endoscope sheath is highly useful in providing improved illumination of the field of view, its projecting rim is a serious detriment during introduction and manipulation of the instrument within the urethra or other duct or cavity in the body of the patient.

It is, therefore, a principal object of the present invention to provide an endoscopic instrument which may be introduced and manipulated within internal ducts and cavities of a patient with substantially greater facility than hitherto without impairing the ilumination afforded by the instrument while in use.

A further object is to provide such an instrument together with an obturator of compact and simple construction for use in the instrument while it is introduced into the body of a patient and while carrying out certain manipulations.

A more specific object is to provide a readily adjustable obturator which in one position, while inserted in the instrument converts the distal end of the tubular instrument with its planar annular end face into a smoothly curved, closed tip.

The foregoing as well as additional objects and advantages of the present invention will be apparent from the following description of a preferred embodiment thereof, together with the accompanying drawings, in which:

FIGURE 1 is an elevational view partially in section and broken away for convenience showing an improved endoscopic instrument of the present invention;

FIGURE 2 is a similar view of the distal end portion of the instrument with the obturator expanded; and FIGURES 3 and 4 are cross-sectional views taken respectively through the lines 3—3 and 4—4 of FIGURE 1.

Referring now to the drawings in detail, endoscope sheath 10 may be constructed as described in detail in said copending patent application No. 312,167. Suffice it to say here that fiber optics in the form of a plurality of elongated glass-coated glass fibers 11 are embedded between inner and outer tubular members 12 and 13, the fibers extending from the annular distal end face 14 to adjacent the proximal end of the sheath where the fibers are brought together to form a rod-like extension 15. The end face 14 of the sheath is substantially planar and is sloped relative to the axis of the sheath 10 so that light directed upon the end of the rod-like extension 15 and conducted along the fiber optics 11 is directed to the field of view of a telescope or other suitable viewing device positioned in the sheath.

Obturator 20 comprises an elongated tube 21, to the proximal end of which there is fixed an annular mounting member 22 formed with a conical seating surface 23. The mounting member 22 is received within the mounting block 16 carried on the proximal end of the sheath 10 and which is internally tapered to receive the mounting mmeber 22. Latching members 17 and 18 mounted respectively on the mounting block 16 and the mounting member 22 serve to secure the obturator 20 in place within the sheath.

Slidably mounted within the tube 21 is a rod 24 which projects beyond the proximal end of the tube 21 through the axial bore 25 formed in the annual member 22. The proximal end portion of the rod 24 extends through a tubular extension 26 slidably mounted in the axial bore 25 of the annular member 22. A knob 26 is connected to the end of the rod 24 and to the proximal end portion of the tubular extension 26. The internal diameter of the tubular extension 26 is somewhat larger than the outer diameter of the tube 21 and forms with the rod 24 an elongated recess 28 in which spring 29 extends. The forward or distal end of the spring 29 abuts against the end wall of the axial bore 25.

Adjacent its distal end, tube 21 has a pair of oppositely disposed slots 30 formed therein through which the opposite ends of a cross pin 31 fixed in rod 24, extends. A tapered sleeve 32 is slidably mounted on the tube 21 and is connected to the opposite ends of pin 31. Thus, when the knob 27 is advanced to shift rod 24 to the right (as shown in the drawing) within tube 21 and to compress spring 29, the pin 31 and the tapered sleeve 32 carried thereby are displaced to the right relative to the tube 21. With spring 29 expanded as shown in FIGURE 1, rod 24 and tapered sleeve 32 are positioned so that the tapered sleeve 32 extends within an annular guide member 33 fixed to the outer surface of tube 21. The pin 31 by its engagement with the left hand ends of the slots 30 serves to limit the motion of rod 24 and thus the expansion of the spring 29.

Closing the distal end of tube 21 is a stud 34, the projecting end 35 of which is externally threaded for a purpose yet to be described. Two transversely mounted pins 36 are each secured in stud 34 and project through tube 21. Four arcuately shaped resilient wing members 37, one secured to each of the projecting ends of the pins 36, are disposed about the exterior of the distal end portion of the tube 21 with their proximal ends adjacent the end of the guide member 33. It is to be noted that the end of the guide member 33 forms substantially the same angle with the axis of tube 21 that the end face 14 forms with the axis of the sheath 10. Furthermore, the wing members 37 are correspondingly dimensioned so that, in the collapsed position shown in FIGURE 1, the free ends of the wing members fit snugly with the end of the guide member 33. Thus, the wing members present a smoothly curved exterior surface which conforms with the curvature of a tip member 38 threaded on the projecting end 35 of the stud 34.

In operation, the endoscope with the obturator 20 positioned therein and latched in place, is prepared for insertion into the urethra or other duct in the body of a patient, by urging the knob 27 toward the mounting member 22. This serves to shift the rod 24 carrying the tapered sleeve 32 under and against the resilient wing members 37 whereby the latter are forced radially outward a corresponding distance to bring their exterior proximal end surfaces into alignment with the external surface of the distal end of the sheath 10. In other words, with the four wing members 37 expanded by the action of the tapered sleeve 32, the outer diameter of the proximal ends of the wing members is substantially equal to the outer diameter of the annular end face 14 of the sheath 10. With the obturator thus expanded, the instrument presents a smoothly curved contour at its distal end terminating with the tip member 38. This greatly facilitates introduction of the instrument into the urethra and greatly reduces discomfort and the risk of injury to the patient. When it is desired to remove the obturator 20 from the sheath 10, it is only necessary to release the knob 27 permitting the previously compressed spring 29 to expand and retract rod 24 and the tapered sleeve 32 carried thereby. Because of their resiliency, with the wing members 37 follow the tapered sleeve 32 at it is withdrawn and return to their collapsed position.

The terms and expressions which have been employed are used as terms of description and not of limitation, and there is no intention, in the use of such terms and expressions of excluding any equivalents of the features shown and described or portions thereof, but it is recognized that various modifications are possible within the scope of the invention claimed.

I claim:

An endoscopic instrument for introduction into internal ducts and cavities in the body of a patient in carrying out medical procedures, comprising a tubular sheath having a substantially planar distal end wall, receiving and latching means mounted on the proximal end portion of said sheath, a tube, means including a mounting member connected to the proximal portion of said tube for releasable engagement with said receiving and latching means to position said tube along the axis of said sheath, the distal end portion of said tube projecting beyond said distal end wall of said sheath, and having a pair of oppositely disposed elongated slots formed therein, a rod slidably mounted in said tube and having its proximal end portion extending through said mounting member, a tubular extension connected to and extending about the proximal portion of said rod and having its distal portion movable in said mounting member, resilient means engaging said mounting member and urging said rod in one direction, a tapered sleeve encircling the distal portion of said tube, means extending through said slots and connecting said tapered sleeve to said rod, a plurality of resilient wing members encircling the distal end portion of said tube and connected adjacent their distal ends to said tube, said wing members normally being positioned closely adjacent the external surface of said tube and having an outer diameter less than the inner diameter of said sheath and said distal end wall, and means extending through said slots connecting said tapered sleeve to said rod so that when said rod is shifted in the direction opposite to said one direction to compress said spring said tapered sleeve urges the proximal end portions of said resilient wing members radially outward a distance such that the outer diameter thereof substantially equals the outer diameter of said end wall.

References Cited

UNITED STATES PATENTS

| | | | |
|---|---|---|---|
| 2,516,628 | 7/1950 | Held | 128—4 |
| 2,621,651 | 12/1952 | Wallace | 128—4 |

RICHARD A. GAUDET, *Primary Examiner.*

DALTON L. TRULUCK, *Examiners.*

UNITED STATES PATENT OFFICE

CERTIFICATE OF CORRECTION

Patent No. 3,326,208                             June 20, 1967

Joseph E. Held

It is hereby certified that error appears in the above numbered patent requiring correction and that the said Letters Patent should read as corrected below.

Column 1, line 58, for "of one of index refraction" read -- of one index of refraction --; column 2, line 40, before "No." insert -- Ser. --; line 59, for "mmeber" read -- member --; line 65, for "annual" read -- annular --; column 4, line 5, strike out "with"; line 6, for "at" read -- as --.

Signed and sealed this 25th day of June 1968.

(SEAL)
Attest:

Edward M. Fletcher, Jr.                                   EDWARD J. BRENNER
Attesting Officer                                              Commissioner of Patents